Aug. 10, 1965  G. M. CROSS  3,200,029
MACHINE FOR EDGE GILDING BOOKS
Filed April 6, 1961  9 Sheets-Sheet 1

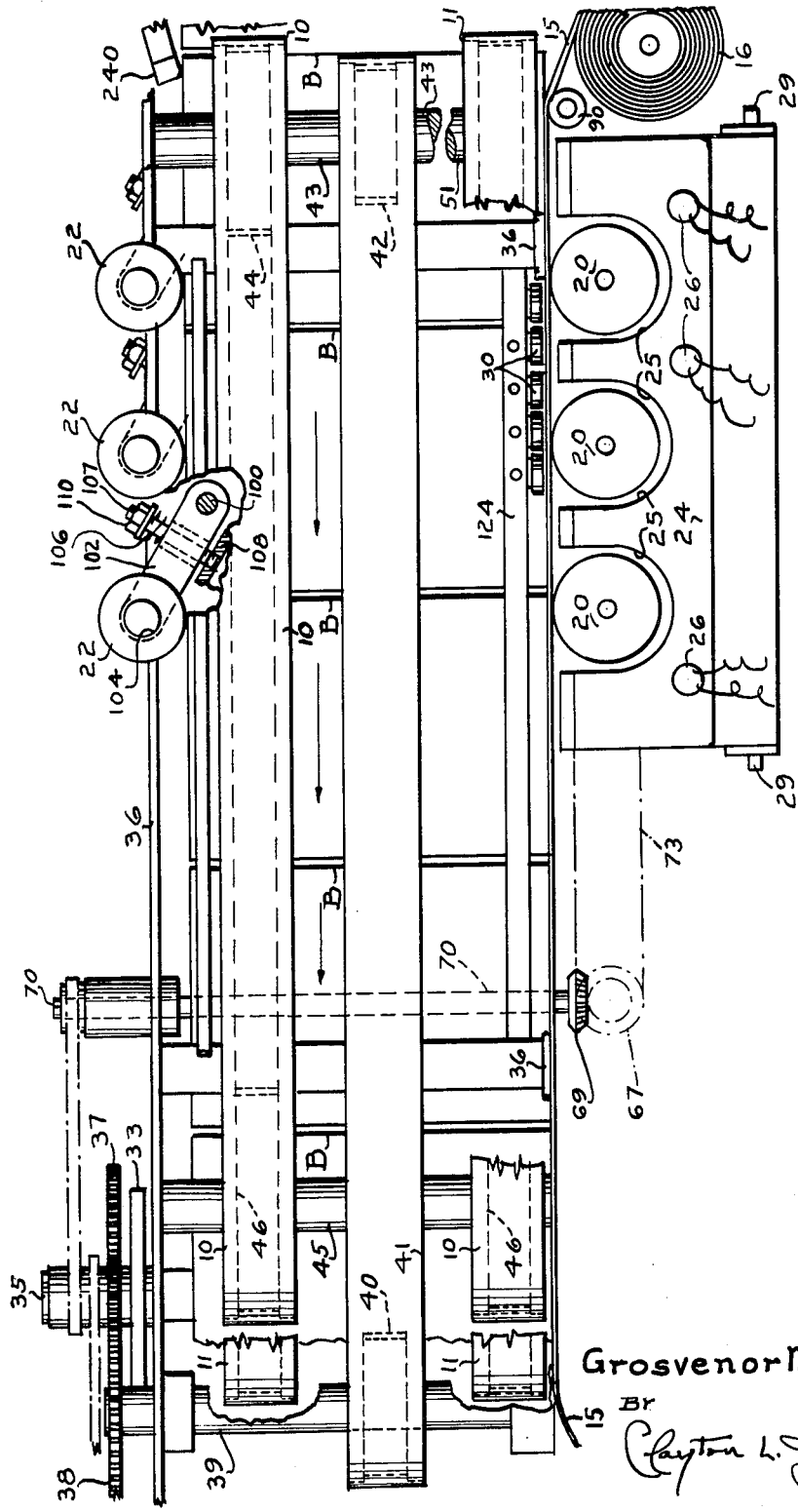

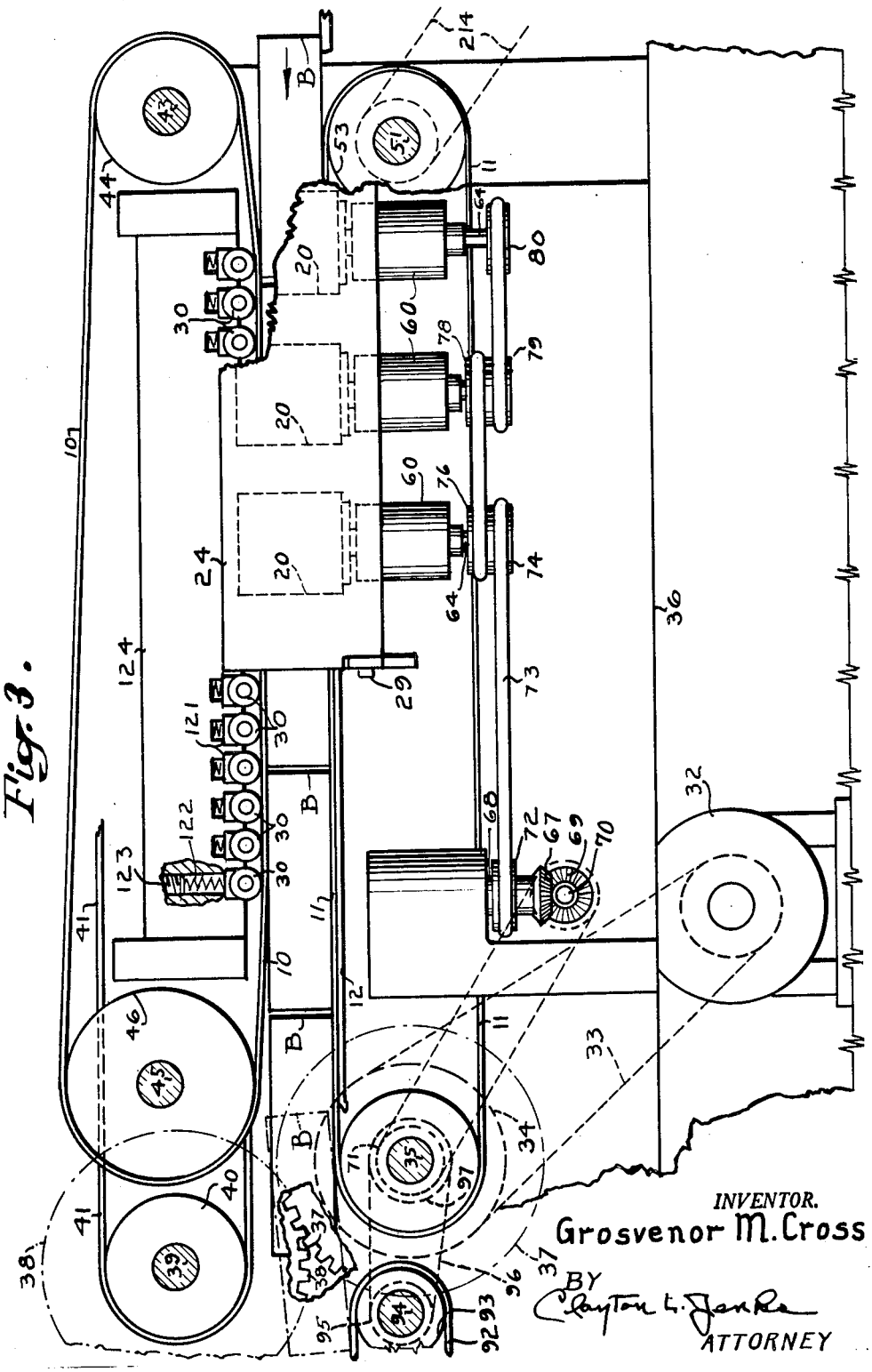

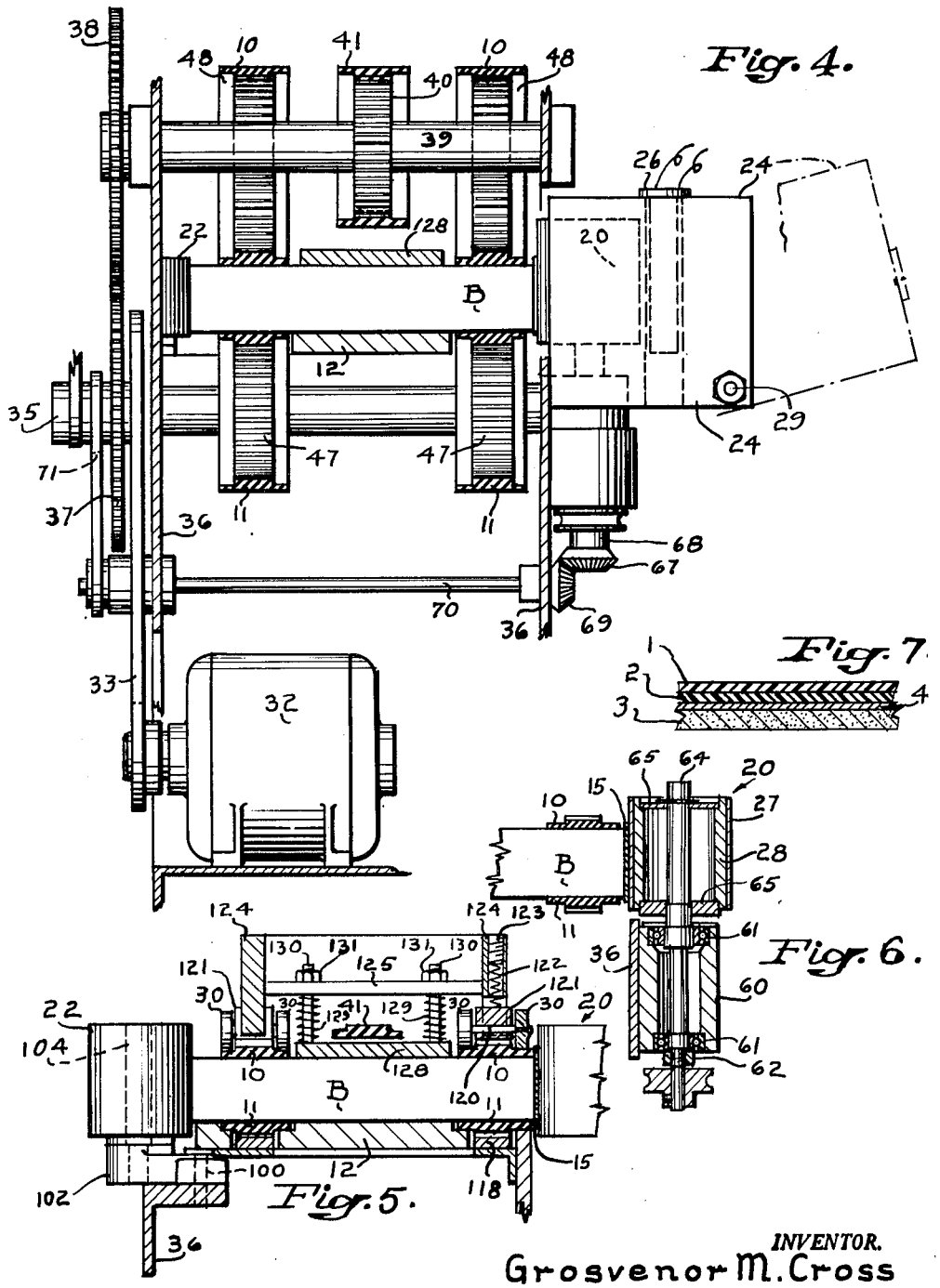

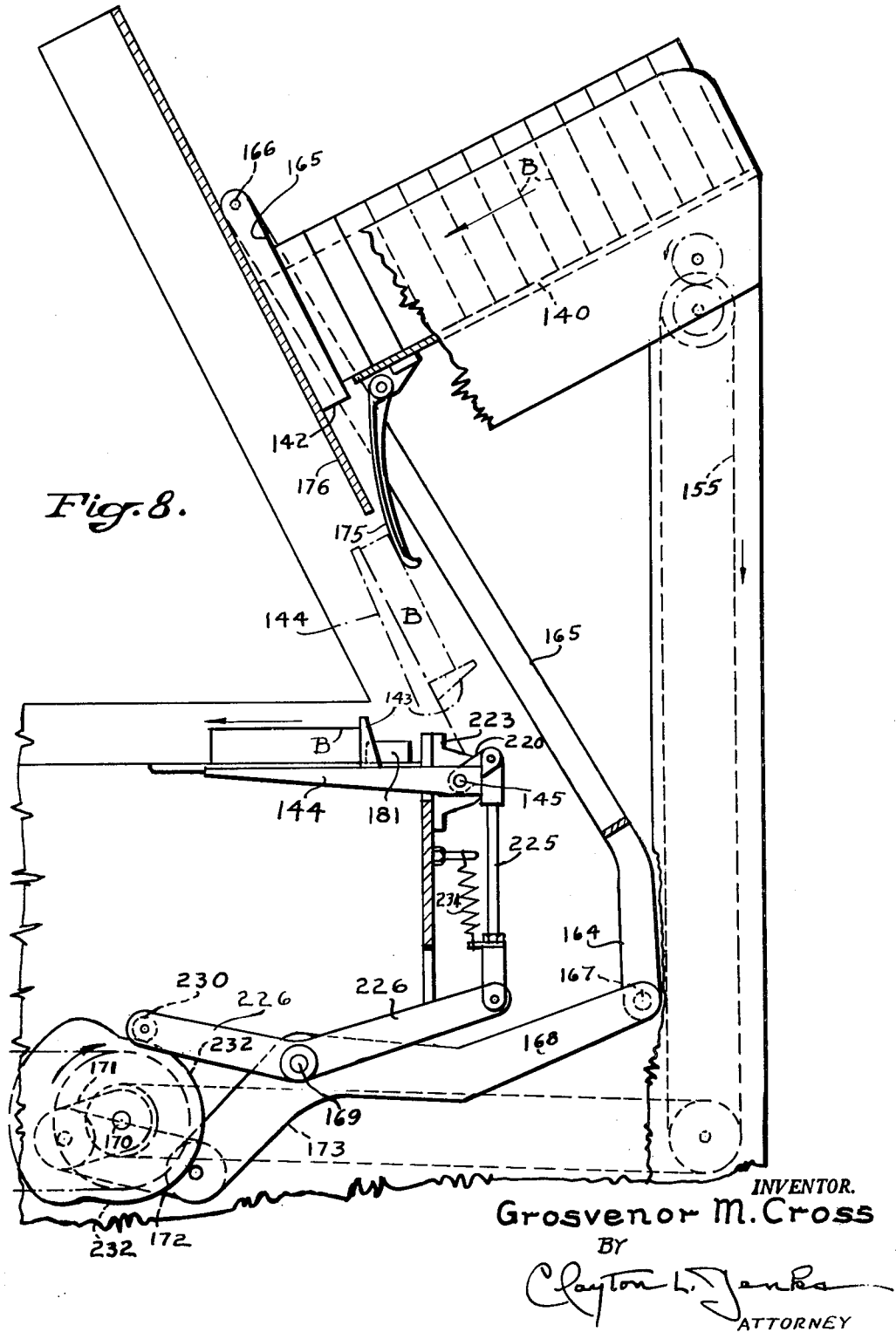

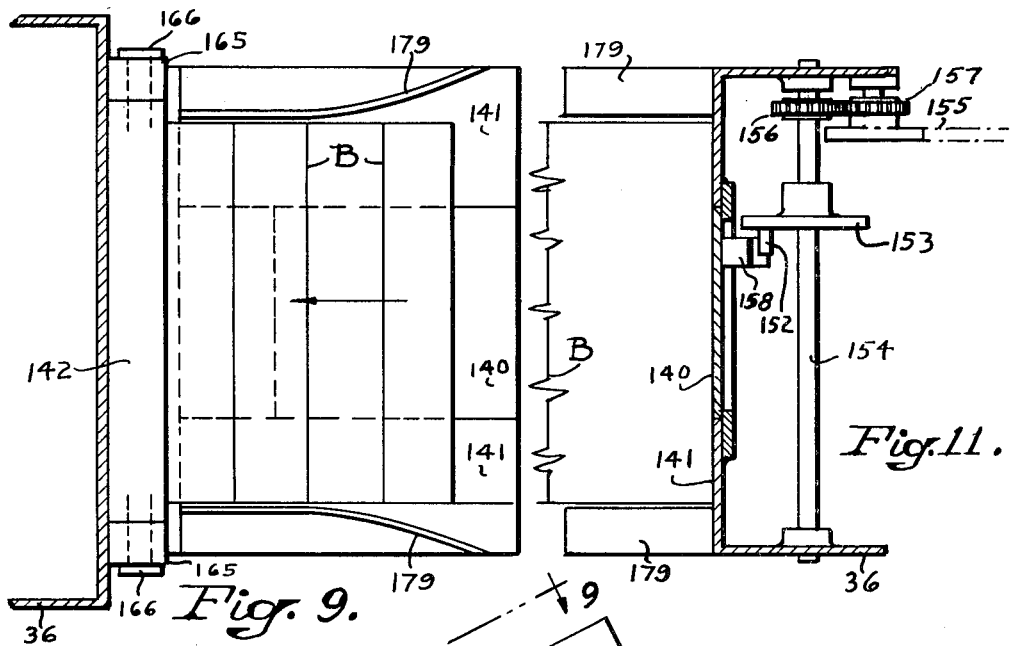
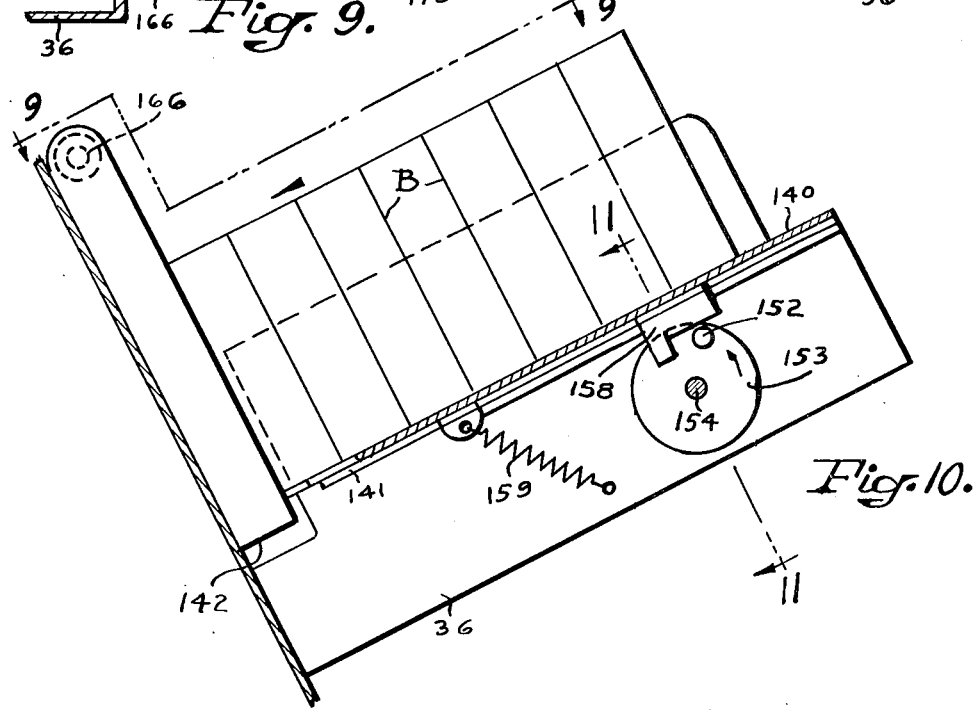

Aug. 10, 1965      G. M. CROSS      3,200,029
MACHINE FOR EDGE GILDING BOOKS
Filed April 6, 1961      9 Sheets-Sheet 9
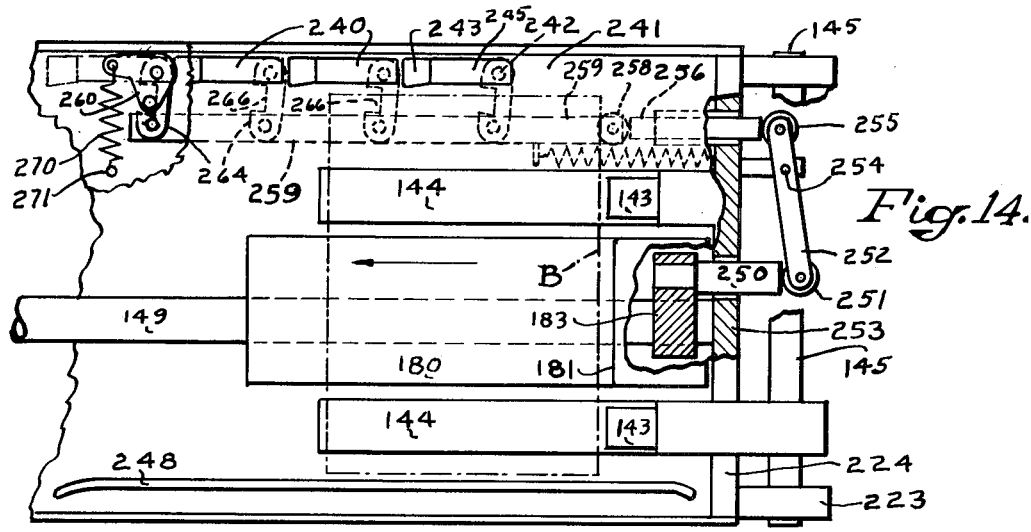
*Fig. 14.*
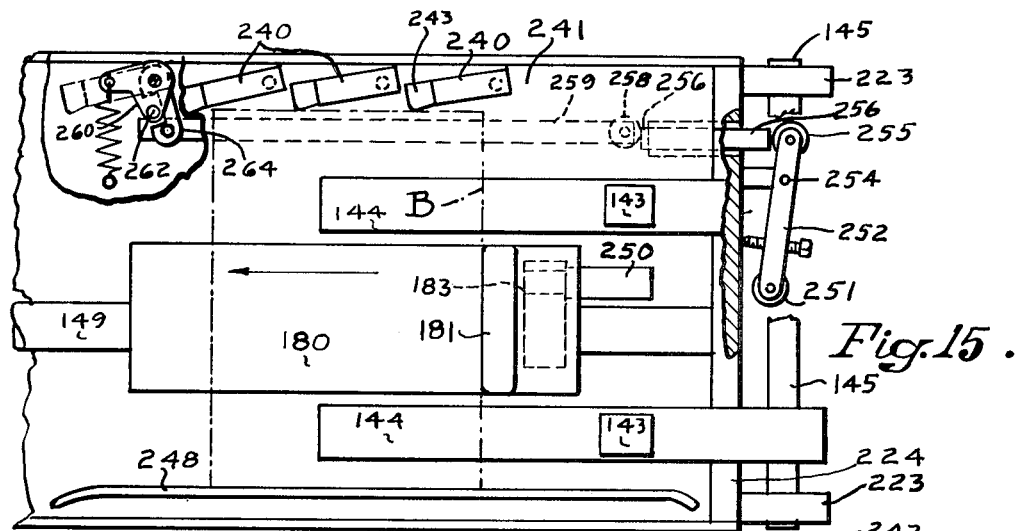
*Fig. 15.*
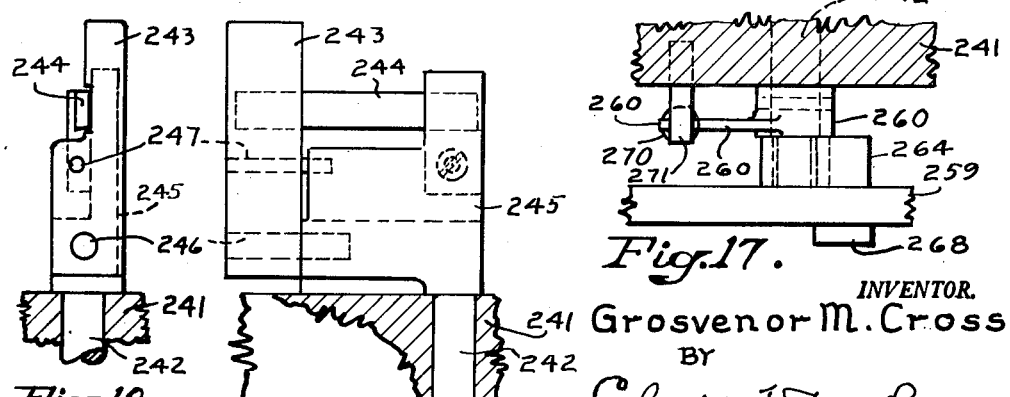
*Fig. 18.*     *Fig. 16.*     *Fig. 17.*
INVENTOR.
Grosvenor M. Cross
BY
Clayton L. Jenks
ATTORNEY

United States Patent Office 3,200,029
Patented Aug. 10, 1965

3,200,029
MACHINE FOR EDGE GILDING BOOKS
Grosvenor M. Cross, West Concord, Mass., assignor to The Colonial Press, Inc., Clinton, Mass., a corporation of Massachusetts
Filed Apr. 6, 1961, Ser. No. 101,203
6 Claims. (Cl. 156—540)

This invention relates to apparatus for applying a coating on like faces of a series of books and more particularly to apparatus which acts automatically to apply a coating, such as a gilt composition, progressively on like faces of each of a series of books fed forward in a closely spaced relationship to and through a transfer zone.

It is customary to apply a coating of gold leaf or a gilt or other composition on the faces formed by the top edges of the leaves of a book, but many problems have been involved in the attempt to provide a satisfactory and uniform coating on a set of books and particularly to obtain a smooth and pleasing appearance. It is especially desirable to overcome the bottleneck in the plant procedure entailed by the many required steps and to apply gilt coatings progressively and continuously to a series of books without requiring the customary manual stages of handling and treating the books. The term "gilt" and similar expressions as used herein are to be interpreted as applying to the various compositions with which a book face is coated.

It is the primary object of this invention to apply a coating composition on the faces of book leaf edges in apparatus wherein the books are fed serially and progressively through a zone where the coating is transferred under heat and pressure from a continuous film carrier to the book sheet faces.

A further object is to provide an automatic mechanism which will give a uniform, satisfactory and pleasing appearance to a series of books without requiring manual operations beyond that of inspection of the products and adjustment control of the mechanisms.

Another object is to feed books progressively and closely spaced to the gilding zone and to avoid the waste of time and materials in the process.

A still further object is to present the books automatically to an endless carrier which transports them serially into firm contact with a gilt coated film and holds the books in alignment and under adequate pressure opposite a heater while the gilt is being transferred to each book.

Another object is to remove the books serially from a supply carrier by a transfer mechanism which moves at such a coordinated rate that the books are thrust one at a time in a closely spaced succession into the nip of conveyor belts which are carrying the books through the gilding zone.

Another object is to provide such constructional features in an automatic mechanism as will serve to align the pertinent surfaces of books with the operation plane of the film. Other objects will be readily apparent in the following disclosure.

In accordance with this invention, a layer of an adherent gilt composition is removably mounted on a film backing, and the gilt is transferred progressively to the assembled edges of the leaves of a series of books by means of heat and pressure. To this end, books are fed serially and continually through the gilding zone by means of an endless carrier, and preferably a set of opposed conveyor belts, and the film carrying the gilt is moved progressively in contact with the moving book surfaces to be gilded, while the book and film travel under pressure past one or more heat applicators, whereby the heat causes the gilt to be transferred from the film to the book. Each heat transfer body preferably comprises a heated roller to which heat is transferred by radiation from a thermostatically controlled electric resistance unit of suitable temperature and heat capacity. The roller may be rotated by frictional contact with the book, but it is preferably driven by power mechanism at the book rate of movement which insures an even heating of the roller surface so that the gilt carrying film is subjected to uniform heat conditions during the transfer procedure. The pressure mechanism may comprise a series of spring pressed guides, and preferably rollers, which insure a proper book alignment and adequate pressure of the gilt against the book. The book is preferably fed to the gilding zone prior to the application of hard cardboard covers thereto, so as to avoid interference with the gilt application. The film from which the gilt has been transferred is fed out of the gilding zone to a position where it is stripped from contact with the book, as by means of gravity or a differential speed mechanism.

The books are fed serially to the conveyors in a closely spaced and aligned arrangement which insures both a minimum waste of gilt material and its proper application without interference from the adjacent books. For feeding the books, the loading mechanism removes the books one by one from the feeding trough and forces each serially into a firm grip with the conveyor belts, while fingers act automatically to align the book surfaces to be gilded. The loading and carrier mechanisms are moved in a timed relationship, which insure an orderly presentation of the books to the gilding strip and the heaters. That strip is preferably formed as a spirally wound film on which the gilt in a powdered form is temporarily secured by means of a heat softenable wax and adhesive, and the temperature of the heater is controlled to insure a satisfactory removal of the gilt from the film and its adherence to the book surface.

Referring to the drawings which illustrate one embodiment of the invention:

FIG. 2 is a fragmentary plan view of the rear portion of the machine showing the heat transfer zone and the associated book conveyor and pressure mechanism, but with various parts omitted for the sake of clarity;

FIG. 3 is a side elevation, partly broken away of the structure of FIG. 2;

FIG. 4 is a vertical rear end elevation, broken away, of the machine;

FIG. 5 is a fragmentary vertical section showing the heat and press rolls;

FIG. 6 is a fragmentary vertical sectional detail through the heat transfer roll;

FIG. 7 is an enlarged view showing a cross-section of the film which carries the gilt layer;

FIG. 8 is a fragmentary vertical side elevation of an elevator mechanism and a pivoted carrier arm which transfer the books serially from a manually loaded trough to the slide of FIG. 12;

FIG. 9 is a plan view on the line 9—9 of FIG. 10 of the inclined feed trough arranged for supplying books to the elevator mechanism of FIG. 8;

FIG. 10 is a side elevation of the trough of FIG. 9 and the book jogging mechanism of FIG. 11;

FIG. 11 is a fragmentary section on the line 11—11 of FIG. 10:

FIG. 14 is a fragmentary plan view of the book aligning fingers in retracted positions which locate each book for gilding;

FIG. 15 is a similar view showing the fingers individually spring pressed inwardly to move a book toward a guide plate at the opposite gilding side;

FIG. 16 shows a vertical detail of the upper portion of the structure of a spring pressed finger;

FIG. 17 is a vertical detail of the finger operating mechanism at the lower portion thereof; and FIG. 18 is an end elevation of the structure of FIG. 16.

Figure 1:
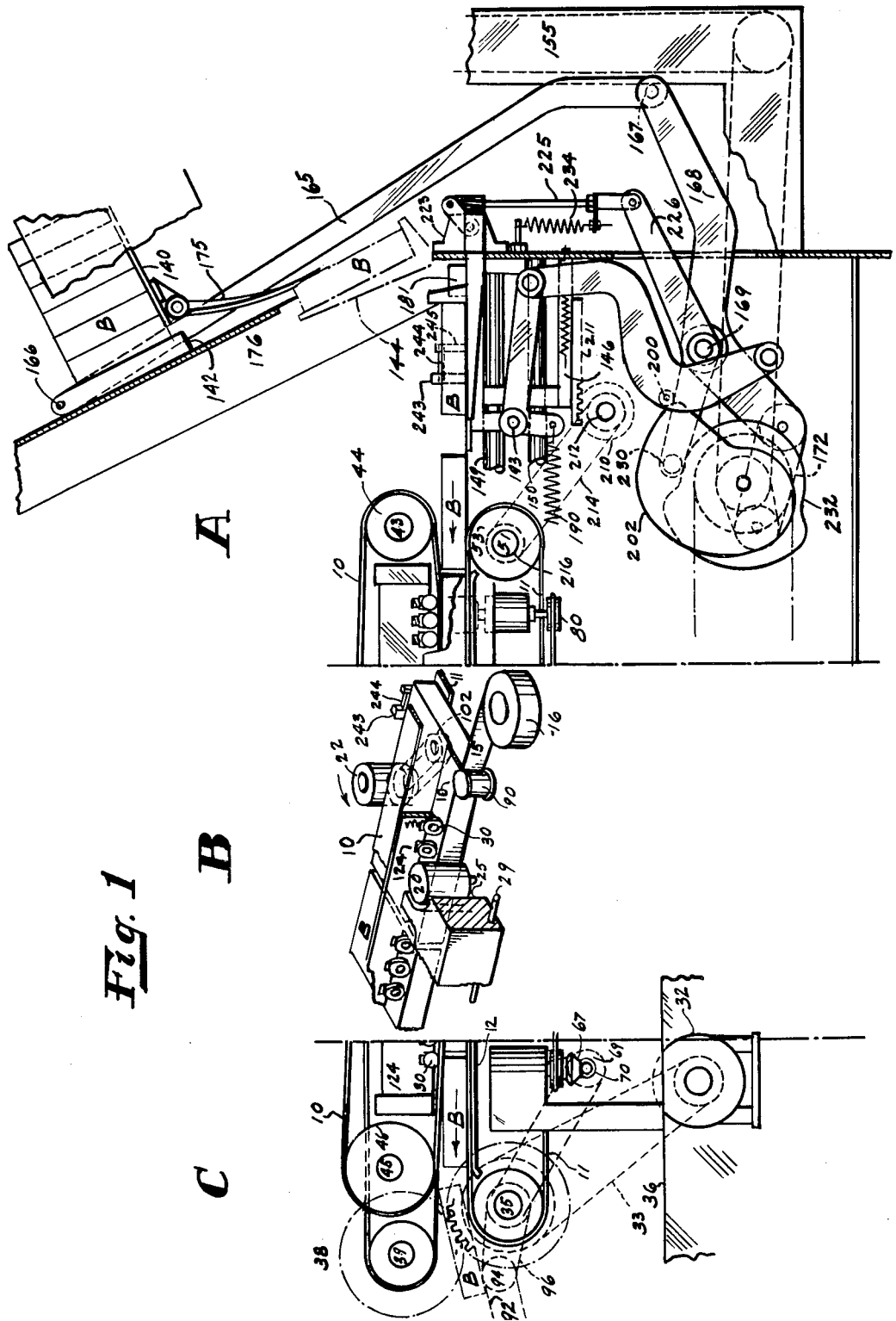
FIG. 1 is a schematic view of the entire machine, in which part A is a vertical side elevation of the right hand portion, part B is a perspective view of the book gilding mechanism, and part C is a side elevation of the left hand end of the machine.

Referring first to FIG. 7, the gilt carrier may comprise a synthetic film base 1 made of a suitable heat resistant substance, such as a Du Pont "Mylar" polyester film. On this film is a thin layer of a suitable heat softenable wax 2 which in turn carries a layer 3 of an adhesive associated with a layer 4 of a gilt powder comprising aluminum of other metal or a mixture of metals or compounds which will give the desired color and finish, such as is in use in various industries. The wax and adhesive are such that the gilt powder will be transferred under heat and pressure to the top edges, for example, of the books, and adhere thereto.

Referring next to FIGURES 1–4, a preferred form of the gilt applying mechanism may comprise two spaced pairs of power driven upper and lower endless conveyor belts 10 and 11 which transport a series of books B therebetween in a closely spaced arrangement along a table 12 between the belt runs. The upper spaced belts 10 are arranged to engage and be pressed against the tops of the books and hold them firmly on the spaced lower conveyor belts 11 and the table 12. Each book may comprise any suitable arrangement of sheets or signatures after the edge portions of the sheets have been cut or otherwise trimmed to a comparatively smooth surface and prior to the application of hard board covers thereon. If the top edges of the book leaves are to be gilded, they are arranged in a vertical plane alignment when the books lie in a flat or horizontal position, so that they may successively receive the gilt from the adjacent surface of the powder coated film, designated as 15, which is fed forward from the spirally wound roll 16 thereof.

This film 15 is fed longitudinally between the vertical top edge faces of the books and a series of heated rolls 20 with its coating of gilt 3, 4 (FIG. 7) in contact with the books. The book is pressed against the film and towards the heated rolls by means of spring pressed rollers 22 pivotally mounted on vertical axes opposite the heated rolls, as will be described.

The heated rolls 20 are preferably heated externally by radiation from a massive metal block 24 which has one or more U-shaped cut-away portions 25 within each of which is mounted a roll 20 on a vertical axis. Suitably constructed electrically insulated wire coils of resistance elements 26 are removably inserted in holes in the block or embedded therein which heat the U-shaped portions of the block to suitable temperatures, and adequate thermostat control is provided. The block 24 may be made of a metal of high heat emissivity, such as steel or cast iron. The roll 20 preferably has a silicone rubber coating 27 (FIG. 6) which provides a yielding surface to insure adequate transfer of the gilt powder to any uneven book surface. This layer 27 mounted on a copper or other metal cylinder 28, is located close to but out of contact with the metal block 24 and is thus heated by radiation and so avoids damage to the roll surface. The block may be pivoted at 29 on a part of the machine frame to permit inspection or cooling of the rollers, as shown by the broken lines in FIG. 4. A suitable surface temperature for the heating rolls may be in the range of 350° to 700° F., depending on the ingredients of the gilt, but this may be varied as desired to insure a satisfactory melting of the wax and the release of the gilding powder and its associated adhesive onto the book surface.

Since the book varies in thickness from the glued or sewed back to the front, a set of rollers 30 of small diameter are mounted to be spring pressed against the tops of the books and hold them firmly against the lower belt 11 and the supporting table 12 along which they slide. The table 12 is shown in FIGS. 4 and 5 as having its top surface in the plane of the book supporting belts at the sides thereof. The rollers 30 compress each book and hold its leaves tightly together so that the gilt cannot be smeared into the book interior.

The two pairs of upper and lower belts 10 and 11 which grip the book therebetween are mounted in a spaced arrangement according to the size of the book to be treated, and each of the belts is power driven from a suitable constant speed electric motor 32 (FIGS. 3 and 4) which acts through a chain or belt drive 33 to rotate the pulley 34 fixed on the lower cross shaft 35 rotatably mounted in bearings carried by the frame work 36 of the machine. A gear 37 on the shaft 35 meshes with and drives an upper gear 38 fixed on the cross shaft 39 which carries a centrally located driving pulley or sprocket 40 keyed thereto. This sprocket 40 (FIG. 2) drives through a belt 41 a central sprocket 42 on the shaft 43 at the front end of the frame work which carries the belt drivers 44 for the upper belt 10. A shaft 45 (FIGS. 1–3) suitably mounted at the rear end of the machine carries two sprockets 46 driven by and supporting the rear portions of belts 10 in their spaced arrangement. The lower belts 11 are driven by two spaced sprockets 47 keyed on the lower rear shaft 35. If sprockets are used to carry the belts 10, each of them has its teeth between upstanding flanges 48, as shown in FIG. 4, which guide the conveyor belt 10 and engage spaced rack bar like teeth on the under sides of the belts 10 and thus serve to drive the latter positively and in synchronism with the rest of the mechanism. A similar construction serves to drive the belts 11. A cross shaft 51 at the right hand end of FIGS. 2 and 3 and the front of this portion of the machine carries rotatable spaced sprockets 53 which support the belts 11. Similar belt and sprocket drives or chain drives may be employed where timing is important. Various mechanical arrangements may be provided for mounting the shafts and adjusting the conveyor belts 10 and 11 to insure the transfer of the books through the gilding zone.

The mount and the drive of each heater 20, shown particularly in FIG. 6, comprises a hollow cylindrical metal casing 60 vertically fixed on the machine framework. This casing has upper and lower recesses forming shoulders carrying upper and lower ball bearings 61 therein and secured in place by a nut 62, as shown. The inner rotatable race-ways are fixed to and suitably support a vertical spindle 64 which at its upper portion carries the heater roll 20. The hollow cylindrical metal body 28 of each heater roll which carries the silicone coating 27 is recessed at its ends and suitably supports upper and lower metal discs 65 which are keyed or other wise secured to the shaft 64 and are held in place by lock washers. This construction serves to rotate the outer shell 27 of the heater in its proper association with the film 15 and the book B.

Each spindle 64 is driven by means of pulleys and a bevelled gear system. This comprises a bevel gear 67 (FIG. 3) on a bevelled jack shaft 68 mounted on the framework. The gear meshes with a bevelled gear 69 on the outer end of a rotatable cross shaft 70 suitably mounted in bearings in the framework 36 (FIGS. 2 and 3). This shaft 70 is belt driven by a pulley 71 keyed on shaft 35. The jack shaft 68 (FIG. 3) carries a pulley 72 which drives through a belt 73 a further pulley 74 on the lower end of the shaft 64 of the left hand heater 20 of the system. That same shaft carries a further pulley 76 which through a suitable belt connection drives a pulley 78 on the next heater shaft, and another pulley 79 on that shaft drives the pulley 80 on the right hand heater of the series. The pulleys and gear system are so constructed that the surface speed of each heater 20 is substantially equal to that of the linear speed of the book B. The pulleys on the several shafts 64 are of the same size so as to insure the heaters rotating synchronously.

As the books travel through the heating zone, they are held in firm contact with the film strip 15 which carries the gilding powder. This strip is shown in FIG. 1 as unwinding from the supply roll 16 and pasing around the guide roll 90 near the supply roll 16 and thence in a straight line between the heaters 20 and the books and issuing at the left hand end of the machine where the film breaks away from each book when the latter changes its speed of travel. This change of speed is accomplished by means of a conveyor belt 92 (FIG. 3) passing around a suitably mounted driven roll 93 and aranged as shown with its upper belt run slightly lower than that of the top run of the lower belt 11 so that the book tips down as it leaves the belt 11 and is transferred to the driven belt 92. The driver roll 93 is so located that the two belts 11 and 92 are close together, as shown. A suitably mounted cross shaft 94 carries the belt roll 93 and a pulley 95 keyed thereon is driven through a belt 96 from a slightly larger driving pulley 97 on the motor driven cross shaft 35. This change in speed when the book is transferred from the conveyor 11 to the conveyor 92 as well as the change in angular direction of travel as the book leaves the belt 11 is found to detach the film 15 readily from the top face of the book if the film has not already fallen away under the influence of gravity. The film issuing from the machine has rectangular spaces where the gilt was formerly positioned which are framed by portions of the gilt which were not removed in the process. One reason for passing the books in a close spacing throughout the gilding zone is to minimize the waste of gilt material on the residue film.

It is necessary that the books be held in close contact with the film 15 and that the latter be firmly pressed against the heated roll 20, with the heat transferable coating on the film located next to the book faces. To this end, a spring urged press roll 22 (FIG. 2) is mounted opposite each one of the heaters. This mount may comprise a vertical pin 100 suitably carried by a laterally adjustable part of the machine frame. The pin pivotally supports a swinging arm 102 which carries at its outer end a pivot pin 104 on which the roller 22 is suitably mounted for free rotation. Each roller is radially opposite a heating roll 20, and it is pressed against the edge surfaces of the leaves normally constituting the bottom of a book by means of a helical spring 106 surrounding a horizontal pin 107 which is threaded into a stationary vertical piece 108 mounted on the machine frame. The pin passes freely through a hole in the arm 102, and the spring is adjustably positioned by a nut 110 threaded on the pin 107. By adjusting the position of the nut, the spring may be given the required tension to hold the book against the film with a suitable force to insure transferring the gilt to the book surface.

As above stated, it is desirable to compress the book vertically at the time of transfer of the coating to it, and this may be effected by two sets of upper individually spring pressed rollers 30 (FIGS. 3 and 5) which are separately mounted so that each may ride either on the book or preferably as illustrated in FIG. 5, on the lower runs of the two spaced upper belts 10. These rollers 30 ride on the smooth inner surfaces of the belt 10 at each side of the centrally positioned rack bar teeth thereon. The upper runs of the lower belts 11 may slide on a suitably located support 118 which receives the thrust of the pressure rollers. Each roller 30 (FIG. 5) is mounted on a spindle 120 suitably carried in a block 121. Each block 121 carrying the rollers 30 is spring pressed downwardly by means of a spring 122 adjustably positioned by a screw 123 within a hollow housing 124. The two housings 124 (FIG. 5) are separated by the cross piece 125. Also, an upper guide plate 128 having upwardly curved ends is located between the lower runs of belts 10 and is spring pressed against the books B, as shown in FIG. 5, by means of a set of helical springs 129 surrounding bolts 130, the latter being threaded into the plate 128. The springs engage the under sides of the supporting bar 125 through which each bolt 130 slidably passes. The position of the plate is adjusted by a nut 131 above and securing the bolt to the bar. The structure may be otherwise arranged to give the desired pressure.

The books, in the embodiment shown, are fed serially to the conveyor belts 10 and 11 from a supply table 140 (FIG. 8) by means of a reciprocating plunger 142 which is moved downwardly to thrust the books successively on to the receiving lugs 143 of a two arm shelf or carrier 144 keyed on cross shaft 145 to swing from a book receiving position (shown in broken lines in FIG. 8) to a horizontal position where the book is substantially in alignment with the nip of the conveyor belts. The book is removed from the pivoted carrier arms 144 by means of speed controlled interfitting U-shaped slides 146 and 148 which slide on pairs of horizontal upper and lower supporting rods 149 and 150 and serve to remove the book from the pivoted arm 144 and thrust it into the nip of the belts 10 and 11, shown in FIGS. 12 and 13 in their two end positions, as will be described.

Mechanism is provided to insure that a book is presented to the reciprocating plunger 142 each time that it moves downwardly. As shown in FIGS. 8 to 11, the book jogging table 140 is suitably mounted to slide on stationary guide ways 141 and arranged as a slide sloping downwardly toward the plunger 142. The table 140 is reciprocated through a slight distance with a jogging motion by means of a cam or pin 152 projecting laterally from a wheel 153 (FIGS. 10 and 11) fixed on the horizontal rotary shaft 154 mounted suitably on the framework. This wheel 153 is driven by gears 156, 157 and a power belt 155. At each revolution of the pin in the direction of the arrow, it strikes a lug 158 mounted on the reciprocable table 140 and projecting into the path of the pin. The pin serves to thrust the table toward the left (FIG. 10) with an abrupt downwardly jogging motion. The table is held in the guide ways 141 and moved upwardly after the pin has passed the lug by means of a tension coiled spring 159 suitably mounted between an ear on the table and a fixed portion of the framework. This jogging action may take place for each reciprocation of the plunger 142. The downward jogging of the books B presents them successively in position beneath the plunger 142 when the latter is in an uppermost location.

The reciprocation of the plunger 142 may be caused by a pair of yoke arms 165 (FIG. 8) pivoted on pins 166 at the opposite top ends of the plunger 142. The arms are shown as connected to a single link 164 pivoted at 167 to the end of a rocking lever 168 fixed on a rocking cross shaft 169 on the framework. The rock shaft 169 is rocked by a crank mechanism powered by a shaft 170 which is driven by the motor 32 or another separate constant speed electric motor. This shaft 170 has a short crank arm 171 keyed thereto. The crank arm is pivotally connected to a link 172 which pivotally connects with a short arm 173 of the lever 168 carried by the rock shaft 169. Thus, for each revolution of the crank arm 171, the plunger 142 is reciprocated to remove the end book from the table 140.

A spring pressed arm 175 is so mounted and located that when a book is moved downwardly by the plunger 142, it crowds past the arm and is thrust laterally toward the left in FIG. 8 to a position where it is received on the carrier arm 144 and its supporting lug 143. The book in this new position is behind the slide surface of wall 176 along which the book moves and so is out of alignment with the movement of the plunger 142 and cannot be injured. The wall 176 terminates just above the uppermost position of the swinging arm 144 and provides room for the book moving into position on the lug 143. As shown in FIG. 9, guides 179 with curved leading ends are suitably mounted at the sides of the stationary parts 141 of the book supply shelf 140 so as to insure that the books will be properly positioned for downward movement by the plunger 142.

Figure 12:
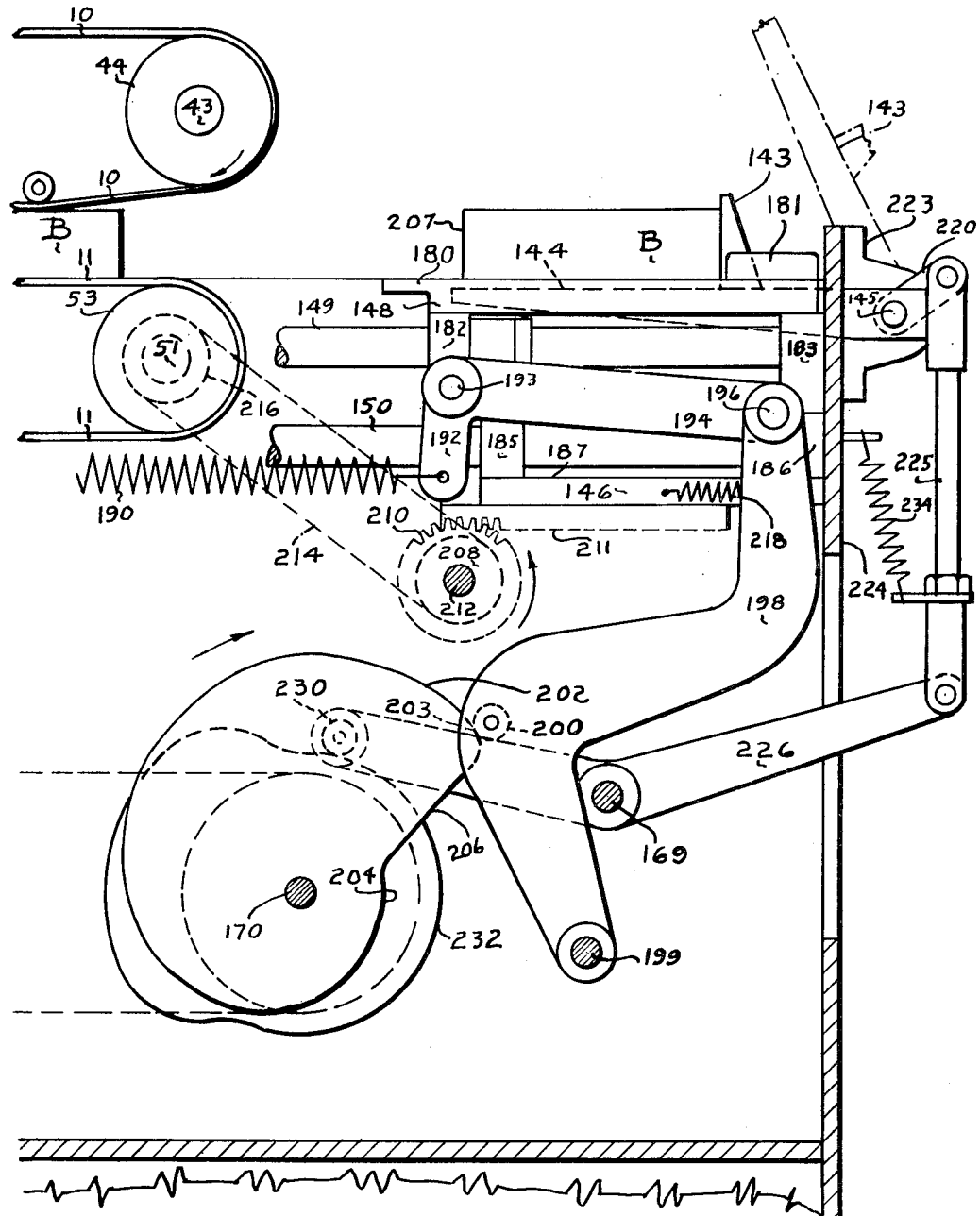
FIG. 12 is a vertical sectional detail of the cam controlled slide in the book receiving position which removes each book from the pivoted carrier arm of FIG. 8 and feeds it to the belt conveyors of FIGS. 2 and 3.
Figure 13:
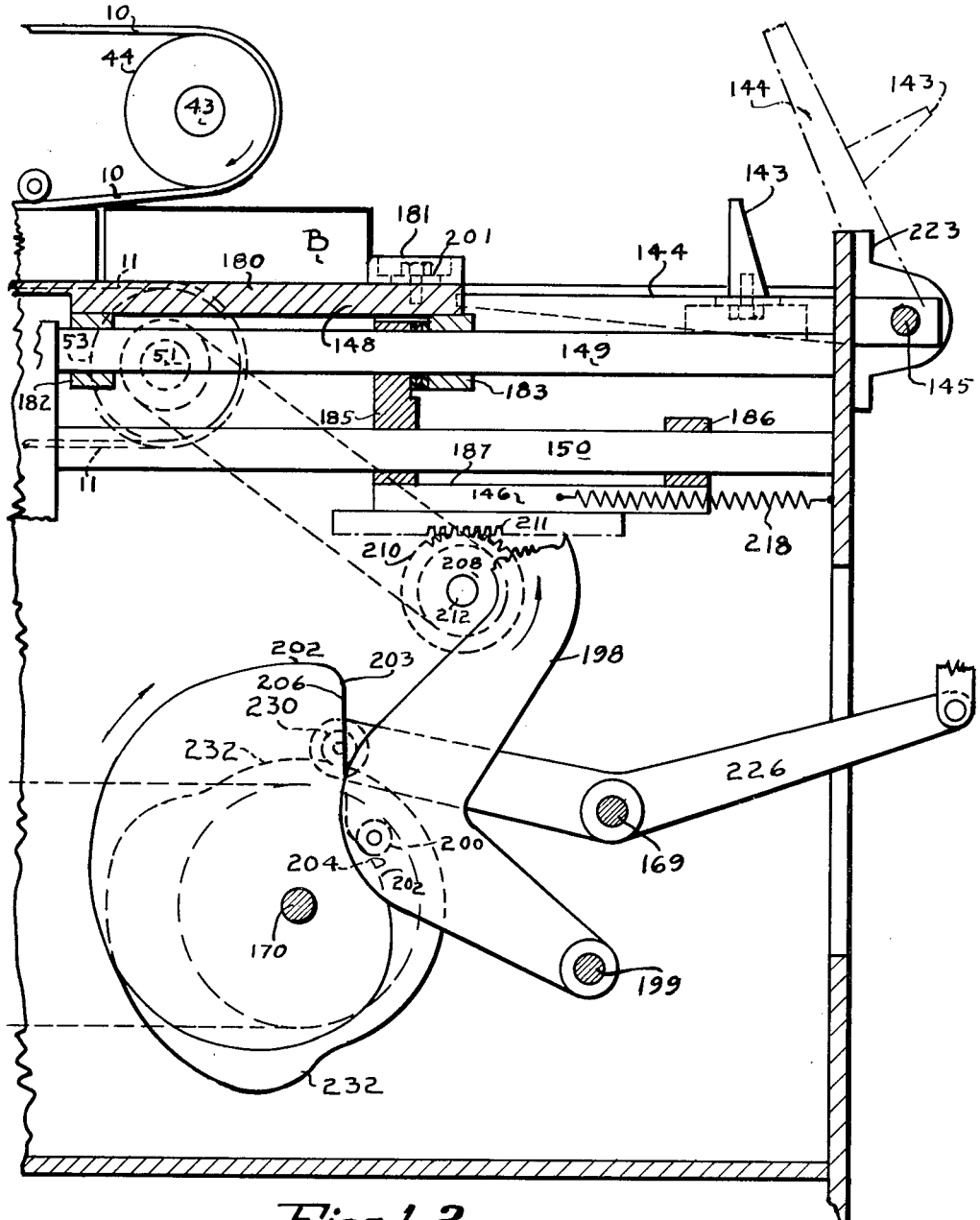
FIG. 13 is a similar view showing the mechanism of FIG. 12 presenting the book to the nip of the conveyor belts.

The mechanism for transferring each book from the swinging arm 144 to the nip of the sprocket driven belts 10 and 11 is shown primarily in FIGS. 12 and 13. In this construction, the slide 148 is shaped substantially as a downward opening U-shaped member having a narrow top table 180 (see FIG. 14) which moves between the parallel spaced arms of the swinging carrier 144. The table 180 carries an upstanding pusher block 181 which causes the book to move with the slide 148. The downwardly opening U-part of the slide 148 comprises a depending wall 182 (FIG. 12) at the left spaced from another depending wall 183 at the right, and both of these walls have axially aligned slide bearings riding on the two parallel horizontal slide rods 149. The other slide 146 has an upwardly opening U-shape formed of the two upstanding spaced arms 185 and 186 carried by a lower plate 187 which have aligned bearings sliding on the two parallel lower slide rods 150. As illustrated, the upstanding part 185 of the lower slide lies between the downwardly depending portions 182 and 183 of the upper slide and is so located as to strike the same. The upwardly extending part 185 also slides on the upper rods 149 as well as the lower rods 150.

The upper table slide 148 is moved toward the left, when permitted by cam mechanism, by a long powerful helical spring 190 (shown only in FIG. 12) mounted at its left hand end on a convenient portion of the machine frame, and at its right hand end it is connected to a downwardly depending arm 192 of an L-shaped lever pivoted at 193 on the side of the depending portion 182 of the slide 148. The right hand portion 194 of this L-shaped lever is pivotally connected at 196 to the top end of a cam arm 198 pivoted at 199 on a horizontal pivot on the machine frame. This cam arm carries a laterally projecting cam follower 200 riding on the periphery of a cam 202 which is also keyed on the transverse rotatable shaft 170 mounted in the machine frame.

It will be observed by reference to FIG. 12 that the cam follower 200 rides up towards the high part 203 from the low part 204 of the cam as the cam lever 198 and the slide 148 are urged by the spring 190 to present a book to the belts, and the cam controls the book movement. The steep portion 206 of the cam is arranged at a suitable angle to move the slide quickly towards the right for receiving a book from the swinging carrier arm 144 and its lug 143. The cam 202 is so shaped that the book of a maximum width enters the nip of the belts at the speed of the belts. The leading edge 207 of the book (FIG. 12) is always located in the same plane for any book size, and the positions of the pusher 181 and the carrier lug 143 are adjusted accordingly for the various book sizes. To this end, as shown in FIG. 13, the block 181 is provided with a wide recess having an elongated slot within which a bolt is adjustably mounted, as indicated at 201. The bolt is threaded into the table 180 and after the block has been adjustably positioned, the bolt is tightened to clamp its head against the recessed portion of the block, as is a customary practice in various arts. The lug 143 is adjusted by a similar or other suitable construction.

The cam shape is preferably such as to move the maximum width of book (within the machine capacity) at a rate which insures that the book reaches the belt nip at a close spacing relative to the preceding book and at the belt speed. For a narrower book, the belt speed is slowed down so as not to waste the coating composition between the books. If the book feeding mechanism is run at a constant speed for all book sizes, as where a separate motor is preferably used to drive the cam shaft 170, then the book would approach the bolt nip at too high a speed, since it had to travel faster than the belts at first so as to close the book spacing. It is, however, desirable that the narrower book approach that nip at substantially the speed of the belts. Hence, a speed control mechanism is provided which will control the narrower book movement.

This speed control mechanism may comprise a standard over-running clutch 208, which may be formed of two concentric driver and driven rings having gripping elements therebetween arranged to bind and force the rings to rotate together when the driver goes in a given direction, but which permit free movement of the driven ring for the opposite direction of rotation. The outer ring is connected to a pinion 210 which meshes with a rack bar 211 depending from the underside of the upwardly opening or lower U-shaped slide member 146. The pinion 210 and the inner ring of the clutch 208 are positively rotated by a horizontal shaft 212 so located as to hold the pinion 210 against the rack bar 211. The inner ring of the clutch plate is driven at a controlled rate coordinated with the belts 10 and 11 by means of a belt 214 driven by a pulley 216 fixed on the rotatable cross shaft 51 (FIG. 3) which carries the lower conveyor belt 11, so that the belt 214 moves in synchronism with the conveyor belts 10 and 11.

When the slide table 180 with its book is started towards the left by the powerful spring 190, the table moves unhampered, except by the cam 202, until its depending wall 183 strikes the upstanding wall 185 of the lower slide 146. This causes the rack bar 211 to move and rotate the outer ring of the clutch. The gripping elements in the clutch are so arranged that if the outer ring attempts to become the driver, the elements hold back on the outer ring and permit it to rotate only at the rate of the belt driven inner ring. Hence the clutch permits the rack bar 211 to move only at a controlled rate which causes the book B to enter the nip of the belts 10 and 11 at the speed at which those belts will subsequently move it. When the cam 202 moves the upper slide towards the right, the clutch permits a free movement of the lower slide 146 by the helical tension spring 218 secured between the lower slide and a part of the frame work. This may cause the cam roller 200 to leave the cam, under the hold back action of the clutch. The part 208 may be a "Sprag" or other well-known clutch.

At the end of the book feeding movement, the cam roller 200 moves up the incline 206 (FIG. 12) towards the high part of the cam 202, and the helical tension spring 218 urges the lower slide quickly from the position of FIG. 13 to that shown in FIG. 12. This movement of the lower slide member 146 separates its upstanding left hand arm 185 from the depending left hand arm 182 on the upper slide. Since the upper slide is connected through the linkage 194 to the cam follower arm 198, that upper slide member is forced toward the right against the tension spring 190 at a rate determined by the shape of the cam surface 206. This cam motion is coordinated with the movement of the swinging arm 144 to insure that the latter has received a book from the plunger 142 (FIG. 8) and is ready to deliver it to the book supporting table 180 when the latter has reached its right hand position for receiving another book.

The swinging movement of the book carrier arm 144 is effected through a simple crank motion provided by the short crank member 220 (FIG. 12) keyed to the shaft 145 which has the arm 144 keyed thereon. The shaft is mounted in suitable ears 223 fixed to the side of the framework 224, and an adjustable link rod 225 connects the crank arm 220 to a cam controlled swinging arm 226 which, in turn, is pivoted on the cross shaft 169. The member 226 is a lever of the first class and carries on its left hand end a cam follower 230 which rides on the periphery of cam 232 keyed to the shaft 170. The cam 232 is so shaped and coordinated with the rest of the mechanism that the swinging book carrying arm 144 remains stationary after it has delivered a book B to the table 180 and until that book has been thrust toward the left by the mechanism above described. Then the cam follower 230 is rocked by its cam 232 to cause the book carrying arm 144 to rise quickly to a book receiving position. A suitably connected spring 234 serves to move the rod 225 upwardly and cause the book carrier 144 to swing downwardly when permitted by the cam 232.

It is desirable that the books be presented to the belts with the faces to be gilded in a proper alignment for contact with the film 15. To this end, as shown in FIGS. 14 to 18, they are transversely moved towards the plane of the film by a set of pushers located at the side of the path of movement of the table 180, just after the books have been removed from the swinging carrier arm 144 and start towards the belts. This construction comprises a set of swinging pusher arms 240 (omitted from FIGS. 12 and 13) which are each pivoted on a vertical pin 242 fixed on the framework 241. As shown in FIGS. 16 and 18, each of the arms 240 had an upright finger or contactor plate 243 spring pressed toward a book contacting position by means of a vertical leaf spring 244 suitably secured horizontally to a vertical block 245 fixed on the pivot 242. The spring bears against the rear face of plate 243 which is pivoted near its bottom on a horizontal pin 246 carried by the block 245. The spring urges the plate 243 towards the book, but the plate cannot move on its pivot beyond a definite substantially vertical position because of a pin 247 projecting horizontally from the plate 243 which strikes the rear face of the block 245. The pin 247 thus keeps the plate from falling too far towards the books. The spring permits a book to spring each contactor back as it moves along and the contactors urge the book towards a guide plate 248 although yielding under the book pressure.

Provision is made to swing the set of contactors 240 out of the way just before the carrier 144 presents a book to the table 180, so as not to injure the edge surfaces of the book leaves. This is accomplished by having the table swing all of the contactors outwardly when the table approaches the book receiving position of FIG. 12. To this end a pin 250 is mounted on the downwardly depending wall 183 of the top slide 148 (FIGS. 14 and 15) and this projects horizontally to be moved through an opening in the wall 253 where it will contact with a roller 251 on the end of a lever 252 of the first class pivoted at 254 on the framework. A roller 255 at the other end of the lever is thrust by the swinging action of the lever into contact with a slide rod 256 suitably mounted in bearings. The other end of that rod 256 is adapted to strike a roller 258 mounted on the end of a reciprocable rod 259, which actuates the pushers 240 as a unit. This rod 159 is connected to swing the book pushing arms 240 outwardly to the position of FIG. 14 when the slide table 180 moves to a book receiving position.

As shown in FIGS. 14 and 17, the pin 242 projects below the support 249 where it carries a triangular plate 260 pinned thereon (see FIGS. 14 and 15). This plate 260 has a depending pin 262. A link 264 (FIG. 14) is pivotally connected at one end to the operating rod 259 and at its other end to the pin 242 about which it pivots. This link has a cut out recess at 266 (FIG. 14) within which the depending pin 262 is located. Since the triangular plate is fixed to the pin 242 which is fixed in turn to the block 245, then when the link 264 is swung by the rod 259 towards the left in FIG. 15 to the position shown in FIG. 14, then the link strikes the depending pin 262 fixed on the triangular plate 260 and causes the plate to swing the contactor arm 240 away from the path of a book. The rod 259 may slide suitably on a set of slide blocks 268 (FIG. 17). A spring 270 is connected between the triangular plate 260 (FIG. 14) and the frame work at 271 and serves to urge the plate and its associated contactor towards a book when the contactor is free to move as shown in FIG. 15. Hence, the operation serves to move the contactor pushers 240 out of the way just before a book starts towards the belts on its carrier slide plate 180. As soon as the slide plate has moved far enough to release the pushers, the book has entered this zone and thereafter each pusher works independently to urge the book laterally as it moves forward towards the pusher rollers 22 and the press rolls 30. Hence, if a book is distorted in shape, it is restored to a correct shape by the pushers 240 thrusting the moving book progressively against the guide plate 248.

The operation of the machine has been largely explained above. The machine is so constructed as to take various widths of book, longitudinally of the line of travel. However, the speeds of the belts and the feed mechanisms are so coordinated that books of a certain maximum width are fed to a close spacing in the coating zone without the assistance of the power-driven overrunning clutch 208 (FIG. 12). When it is desired to apply a coating, such as a gilt composition or a discontinuous design or words, to a book face of a narrower width, then the speed of the belts 10 and 11 is slowed down so as not to waste the gilt composition on the film by running the belts at too high a speed. For that condition, the clutch 108 is used to slow down the book feeding rate just before the book enters the nip of the belts, so as to maintain the proper spacing and to present each book at the belt speed.

The shapes of the cams are coordinated with the conveyor speed and the swinging motion of the carrier arm 144 so as to give ample time for loading the book on to the slide table 180 as well as to insure that each book moves rapidly enough towards the conveyor 10, 11 to catch up, as it were, with the next preceding book. Since the cam shaft 170 turns at a uniform rate, it is desirable that the high portion of the cam 202 provide a short dwell period during which the book may be transferred from the swinging carrier arm 144 to the table 180. Thereafter, the book is moved by the table 180 for part of its travel more rapidly than it will subsequently be carried by the belts. At the final stage of slide movement, the cam shape is such that the book enters the nip of the belts at substantially the speed of the latter.

In the embodiment of feed mechanism illustrated primarily in FIG. 8, the reciprocating plunger 142 removes books serially from the slide table 140 and presents them, once for each revolution of the cam shaft 170, to the swinging carrier 144. The books are stood on the table with like faces of the book leaf edges similarly arranged, or (FIG. 8) with the top leaf faces of the books at the front. To make sure that a book is always located beneath the plunger 142 when the latter is in a raised position, the jogging mechanism of FIG. 10 is employed so as to require no attention on the part of the machine attendant, except that of loading the table 140. This jogging motion is provided by a pin 152 striking the arm 158 of the table 140 which gives a quick shock or jogging action to the books which are arranged substantially vertically on the table, so that they slide downwardly toward the plunger feeding position when the plunger has been elevated to its maximum height. Thereafter, through the action of the rocking lever 168 and the crank arm 171 pinned to the shaft 170, the plunger 142 strikes the top face of the book and thrusts the book downwardly, whereupon the spring pressed arm 175 forces the book toward the left and onto the lug 143 of the swinging carrier 144.

The reciprocating slide mechanism has positioned the table 180 at the right, as shown in FIG. 12, immediately before the carrier 144 is moved down by its crank arm 220. That crank is operated by the rocking lever 226 carried on the fixed pivot 169 and rocked by cam 232. The shape of that cam 232 between its high and low parts is such that the cam follower moves quickly from the cylindrical high portion of the cam toward the cylindrical low portion and raises the carrier arm rapidly to a book receiving position where it dwells momentarily. It is then lowered to deliver the book to the slide table where it is again held stationary by the top portion of the cam 232 until the book has moved toward the left.

The rotating cam 202 (FIG. 12) which controls the slide table movement is cylindrical for a short distance from its high point 203 to provide a dwell while the book is being received. Then the follower 200 moves rapidly down the cam incline and the table 180 is moved faster than the longitudinal rate of belt movement. This slide motion is caused by the powerful spring 190, but the speed of the slide is controlled by the shape of the cam 202, which may be widely varied within the requirements of the operation. When the upper slide 148 has been moved by spring 190 to a point where its rear depending wall 183 strikes the upwardly extending wall 185 of the lower slide 146, then the rack bar 211 on that lower slide and the clutch 208 assume control. At that time the table is moving faster than the belt speed, but the overrunning clutch has its inner ring positively rotated at a slower speed by its driving belt 214 which in turn is driven with the conveyor belt. The cam 202 is rotating continuously, but the overrunning clutch holds back on the cam follower arm 198, and the cam follower 200 may thereupon leave the surface of the cam momentarily until the clutch 208 has permitted the book to enter the nip of the belts (FIG. 12). Then, the steep part 206 of the cam, which may be 45° to a radius, thrusts the upper slide 148 and its table 180 quickly toward the right. This separates the slide arms 182 and 185, and the lower slide is then returned by its spring 218 to the initial position of FIG. 12.

Prior to its entering the nip of the belts, the uncased book is shaped by the spring pressed arms 240 of FIGS. 14 to 18 inclusive. The book has the coating composition applied before any hard board covers have been placed thereon, and the term book is to be interpreted as covering that uncased condition as well as a book which has a paper or other type of cover trimmed to the size of the book pages. A book in that condition may be skewed or distorted in shape and such incorrect shape might be maintained by the book compacting pressure applied by the rollers 30 (FIG. 5). Hence, the mechanism of FIGS. 14-18 is intended to restore the book to substantially its normal shape, so that the top faces of the book leaf edges of the series of books will lie substantially in a plane, which is shown as vertical in the drawings.

The arms 240 act individually to press the book into shape, but they are removed from the path of the book as it is delivered by the swinging carrier arm. When the table 180 (FIG. 14) is moved toward the right for receiving another book, its projecting pin 250 strikes a rocking lever 252 and thrusts the operating rod 259 toward the left. This rod is pivotally connected to the swinging links 264 and causes the book pushing arms 240 to move outwardly to the positions of FIG. 14, where they do not interfere with the book entering this zone. When the upper carrier table 180 starts moving up toward the left it releases the rod 259 and each of the swinging arms 240 is then free to engage the bottom face of the leaf edges of each book and to crowd the book back into a correct shape against the limiting guide 248 (FIG. 14). This is caused by the spring urged pusher plates 243 of the arms 240 which act progressively on the moving book. The arm 240 (FIG. 15) comprises a swinging plate 245 carried by the pivot 242 on the framework. A pusher finger 243 is pivoted at 246 (FIG. 18) on the plate and spring urged to shape the book by means of the leaf spring 244. Hence the several fingers slidingly engage the bottom face of the leaf edges as the book moves therepast, and they push the top leaf face into the plane of contact with the vertical guide plate 248. At the start, the plate 245 is swung outwardly by the triangular plate 260, which is fixed to the pivot post 242, being struck and moved by the link 264 pivotally connected to both the pin 242 and the push rod 259. The spring 270 pulls the plate 260 back when the link 264 releases the pin 262 on the plate 260, and the leaf spring 244 urges the fingers 243 to shape the book. This action of shaping the book is initiated after the book has been located by the swinging carrier opposite to the first pusher, after the pushers have been moved out of the book path by the slide bar 259.

The book in its proper shape is then caught into the nip of the belts and then transferred into the coating zone. The upper and lower belts 10 and 11 now hold each book firmly therebetween while the laterally swinging pusher rolls 22 urge the book laterally and hold it firmly against the transfer film strip 15 which in turn is pressed against the rotating heater roll. The purpose of the rolls 30 (shown best in FIG. 5) is to compact the book, so that the book leaves are in tight engagement and the coating composition cannot enter any spaces therebetween. The book is sliding longitudinally between the spring pressed plate 128 and the table 12 while it is being carried forward by the belt runs, so that the central portion of the book is held compact. The rollers 30 are to compact the edge portions of the book leaves. These rollers preferably ride on the top faces of the belt 10 and depress the book downwardly against the table 118 beneath the lower belt 11. The back portion of the book is usually higher than the front edge portion, so that the rollers ride in a caterpillar like fashion up over the bound backs of the book and down again. Hence the plurality of rollers is important.

The film strip 15 (FIG. 1) passes from the supply roll 16 between the top face of the book edges and the heater roll 20 as shown in FIG. 6. The roll 20 receives heat by indirect radiation from the massive metal block 24, but it is out of contact with that block so that the silicone surface layer of the heater is not damaged by friction. The film composition is transferred to the adjacent book face by the heat from the rolls 20 which softens the wax layer, and the pressure imparted by the rollers 22 insures that the coating is both smooth and in firm contact with the book face. The film moves along with the books until it has passed the pressure done. It is found that the film tends to strip away from the book under the influence of gravity. However, this stripping action is effected positively by the mechanism shown in FIG. 3 which comprises the conveyor belt 92 moving slightly faster than the belt 11 and being so located that the book is tipped down onto the lower belt and thus tears away from the film.

The term coating as used herein is intended to cover various printings and discontinuous designs which may be transferred to a book from a strip carrying the transfer material removably mounted thereon. It will also be appreciated that many modifications may be made in this structure within the scope of the appended claims and that the above disclosure of a preferred embodiment and use is not to be interpreted as imposing any limitations on the claims.

What is claimed as novel and useful is:

1. A book coating apparatus comprising a power operated conveyor for progressively and continuously moving a set of books serially with like faces of the book leaf edges similarly arranged, a strip of transfer film having a layer of heat softenable coating composition removably secured thereon, said film being in contact with said book faces and movable at the rate of the books, a heater adjacent to the film for softening and transferring the composition progressively to the adjacent book faces, a pressure device which progressively compacts each book adjacent to said face prior to the application of a coating thereto and maintains the book compacted as it moves past the heater after which the pressure is released, and pressure means opposite to said heater which progressively presses the book laterally towards the heater and holds it in close association with the film and heater to insure transfer of the composition to the book face.

2. Apparatus according to claim 1 in which the pressure means comprises a pivotally mounted spring pressed roller engageable with each book as it passes the heater which presses the book against the composition side of the film strip, and said pressure device comprises a set of pivotally mounted spring pressed rollers arranged to ride progressively over the book and conform to the shape thereof while compacting the book.

3. Apparatus according to claim 1 comprising a guide plate engageable with each book before it moves into association with the heater, and a set of spring pressed pushers progressively engageable with each moving book which thrusts the book against said plate to reshape and correct any distorted condition of the book.

4. Apparatus according to claim 1 comprising a table for holding a supply of books, a reciprocable pusher arranged to remove the books serially from the table and power operated book feeding mechanism arranged to receive the books as delivered by the pusher and feed each to the conveyor at the rate of movement of the latter.

5. Apparatus according to claim 4 in which the book feeding mechanism comprises a reciprocable slide arranged to move from a book receiving position to one of presenting the book to the conveyor and cam controlled mechanism to move the slide at first more rapidly than the conveyor rate after the slide has received the book and then slower at the conveyor rate which insures delivering books serially to the conveyor in a closely spaced arrangement.

6. A book coating apparatus for shaping a distorted book comprising conveying mechanism to move the book progressively forward, a guide plate engageable with a leaf edge face and parallel with its plane of movement, a set of movable pushers progressively engageable with the moving book on a face opposite to said face, means yieldingly urging the pushers separately to press the moving book against said guide plate and means for initially moving the pushers out of the path of the book and subsequently releasing them for engaging the book when it is opposite to a first pusher of the set.

References Cited by the Examiner
UNITED STATES PATENTS

| | | | |
|---|---|---|---|
| Re. 24,097 | 11/55 | Von Hofe | 156—566 X |
| 1,922,852 | 8/33 | Humphrey | 156—556 |
| 2,501,539 | 3/50 | Ruth | 156—542 |
| 2,645,871 | 7/53 | Bostwick | 156—499 XR |
| 2,895,148 | 7/59 | Hildmann | 11—1 |
| 2,968,336 | 1/61 | Martin et al. | 156—274 |
| 3,149,217 | 9/64 | Reed et al. | 11—1 |

ALEXANDER WYMAN, *Primary Examiner.*

CARL F. KRAFFT, *Examiner.*